United States Patent
Zhang et al.

(10) Patent No.: US 11,572,095 B2
(45) Date of Patent: Feb. 7, 2023

(54) METHOD AND SYSTEM FOR ELECTRONIC POWER STEERING ANGLE CONTROL WITH NON-ZERO INITIAL CONDITION

(71) Applicant: STEERING SOLUTIONS IP HOLDING CORPORATION, Saginaw, MI (US)

(72) Inventors: Xingye Zhang, Saginaw, MI (US); Anthony Champagne, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 41 days.

(21) Appl. No.: 16/722,496

(22) Filed: Dec. 20, 2019

(65) Prior Publication Data

US 2020/0277006 A1     Sep. 3, 2020

Related U.S. Application Data

(60) Provisional application No. 62/811,997, filed on Feb. 28, 2019.

(51) Int. Cl.
*B62D 5/04* (2006.01)

(52) U.S. Cl.
CPC ......... *B62D 5/0487* (2013.01); *B62D 5/0463* (2013.01)

(58) Field of Classification Search
None
See application file for complete search history.

(56) References Cited

U.S. PATENT DOCUMENTS

| | | | |
|---|---|---|---|
| 5,521,820 A | 5/1996 | Wakamatsu et al. | |
| 10,351,168 B2* | 7/2019 | Tsubaki | B62D 5/0463 |
| 11,056,993 B2* | 7/2021 | Ohno | H02P 21/22 |
| 11,095,247 B2* | 8/2021 | Toko | B62D 5/046 |

(Continued)

FOREIGN PATENT DOCUMENTS

| | | |
|---|---|---|
| CN | 104583056 A | 4/2015 |
| CN | 104742959 A | 7/2015 |

(Continued)

OTHER PUBLICATIONS

Astrom et al. (Feedback Systems An Introduction for Scientists and Engineers Second Edition, Aug. 17, 2019) (Year: 2019).*

(Continued)

*Primary Examiner* — Jeff A Burke
*Assistant Examiner* — Jerrod Irvin Davis
(74) *Attorney, Agent, or Firm* — Dickinson Wright PLLC

(57) ABSTRACT

Technical solutions described herein include a method of controlling, in an electric power steering system, a steering angle according to a target steering angle by computing an initial value of an integral control term in a proportional integral derivative (PID) control loop used to calculate a control output signal, such as a motor torque command. The initial value of the integral control term is computed as a negative of the initial value of the feedforward term minus the initial value of the feedback term. The initial value of the integral control term corresponds to an initial value of a (Continued)

control output. Accordingly, the technical solutions described herein facilitate handling non-zero initial condition in Electric Power Steering angle control.

20 Claims, 6 Drawing Sheets

(56) References Cited

U.S. PATENT DOCUMENTS

| | | | | |
|---|---|---|---|---|
| 2010/0168963 | A1* | 7/2010 | Yamamoto | B62D 5/0463 701/42 |
| 2014/0365077 | A1* | 12/2014 | Kariatsumari | B62D 6/002 701/41 |
| 2017/0253269 | A1* | 9/2017 | Kanekawa | B62D 5/0484 |
| 2017/0361869 | A1* | 12/2017 | Hales | B62D 5/0463 |
| 2018/0022354 | A1* | 1/2018 | Akatsuka | B60W 10/04 701/41 |
| 2018/0057054 | A1* | 3/2018 | Tokoro | B60R 11/04 |
| 2018/0170431 | A1* | 6/2018 | Shirozono | B62D 15/025 |
| 2019/0233001 | A1* | 8/2019 | Namikawa | B62D 5/001 |
| 2020/0023893 | A1* | 1/2020 | Naik | B62D 6/008 |
| 2020/0290668 | A1* | 9/2020 | Moreillon | B62D 15/025 |
| 2021/0016825 | A1* | 1/2021 | Miura | B62D 6/00 |

FOREIGN PATENT DOCUMENTS

| | | |
|---|---|---|
| CN | 107010100 A | 8/2017 |
| CN | 107107951 A | 8/2017 |
| CN | 107873008 A | 4/2018 |
| DE | 112007002946 B4 | 7/2014 |

OTHER PUBLICATIONS

Govender, Vivan, and Steffen Müller. "Modelling and position control of an electric power steering system." IFAC—PapersOnLine 49.11 (2016): 312-318.

Office Action regarding corresponding CN App. No. 202010127962.9; dated Jan. 17, 2022.

Office Action regarding corresponding DE App. No. 10 2020 104 449.6; dated Feb. 16, 2022.

Office Action regarding corresponding CN App. No. 202010127962.9; dated Sep. 7, 2022.

* cited by examiner

METHOD AND SYSTEM FOR ELECTRONIC POWER STEERING ANGLE CONTROL WITH NON-ZERO INITIAL CONDITION

CROSS-REFERENCE TO RELATED APPLICATION

This patent application claims the benefit of U.S. Provisional Patent Application No. 62/811,997, filed Feb. 28, 2019, the disclosure of which is incorporated herein by reference in its entirety.

BACKGROUND

Electric power steering (EPS) systems play a vital role in the advanced driver assist system (ADAS) or autonomous driving. In autonomous driving, the EPS systems provide the desired motor torque command to control the steering angle to follow the target angle generated from path planning. It also occurs in Steer-By-Wire system, where the mechanical connection between column and rack is replaced by electronic signals. The rack together with road wheels is connected to an electric motor, referred to as road wheel actuator, which generates a motor torque to drive the rack and road wheel assembly to follow the corresponding steering wheel angle or column angle.

Many conventional EPS systems use control loops having an integral control term to compute a control output signal that is used to operate a motor and to adjust a steering angle. Such control loops have a variety of applications, such as in ADAS, autonomous driving, and/or in drive-by-wire systems. One common type of a control loop having an integral control term is a proportional-integral-derivative (PID) control loop. A common problem with traditional control loops is that large outputs may be generated when the control loops are first initiated. Such large outputs may have adverse effects, such as undesired movement in the steering system. One solution to the large outputs upon initiation of traditional control loops is the use of one or more blending factors that gradually increase the effect of the control output over time. However, the use of a blending factor can cause undesirable results such as a non-smooth transition, and/or a delay before control is stabilized. Additionally, blending factors require additional tuning and increase the complexity of the system.

SUMMARY

According to one or more embodiments, steering system comprises a motor configured to adjust a steering angle, and a processor coupled with the motor, with the processor configured to perform a method for controlling the motor according to a target steering angle. The method comprises: computing an error signal as a difference between the target steering angle and an actual steering angle; computing a feedforward term as a function of the target steering angle; computing a feedback term as a function of the actual steering angle; computing a control output signal using an integral control term based upon an integral of the error signal plus an initial value; computing the initial value of the integral control term based on the feedback term and the feedforward term; and operating the motor using the control output signal.

According to one or more embodiments, a method for controlling a steering angle according to a target steering angle in a steering system includes computing an error signal as a difference between the target steering angle and an actual steering angle; computing a feedforward term as a function of the target steering angle; computing a feedback term as a function of the actual steering angle; computing a control output signal using an integral control term based upon an integral of the error signal plus an initial value; computing the initial value of the integral control term based on the feedback term and the feedforward term; and operating a motor using the control output signal.

According to one or more embodiments, a control system comprising a processor configured to perform a method for controlling a steering angle according to a target steering angle in a steering system. The method includes computing an error signal as a difference between the target steering angle and an actual steering angle; computing a feedforward term as a function of the target steering angle; computing a feedback term as a function of the actual steering angle; computing a control output signal using an integral control term based upon an integral of the error signal plus an initial value; computing the initial value of the integral control term based on the feedback term and the feedforward term; and operating a motor using the control output signal.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
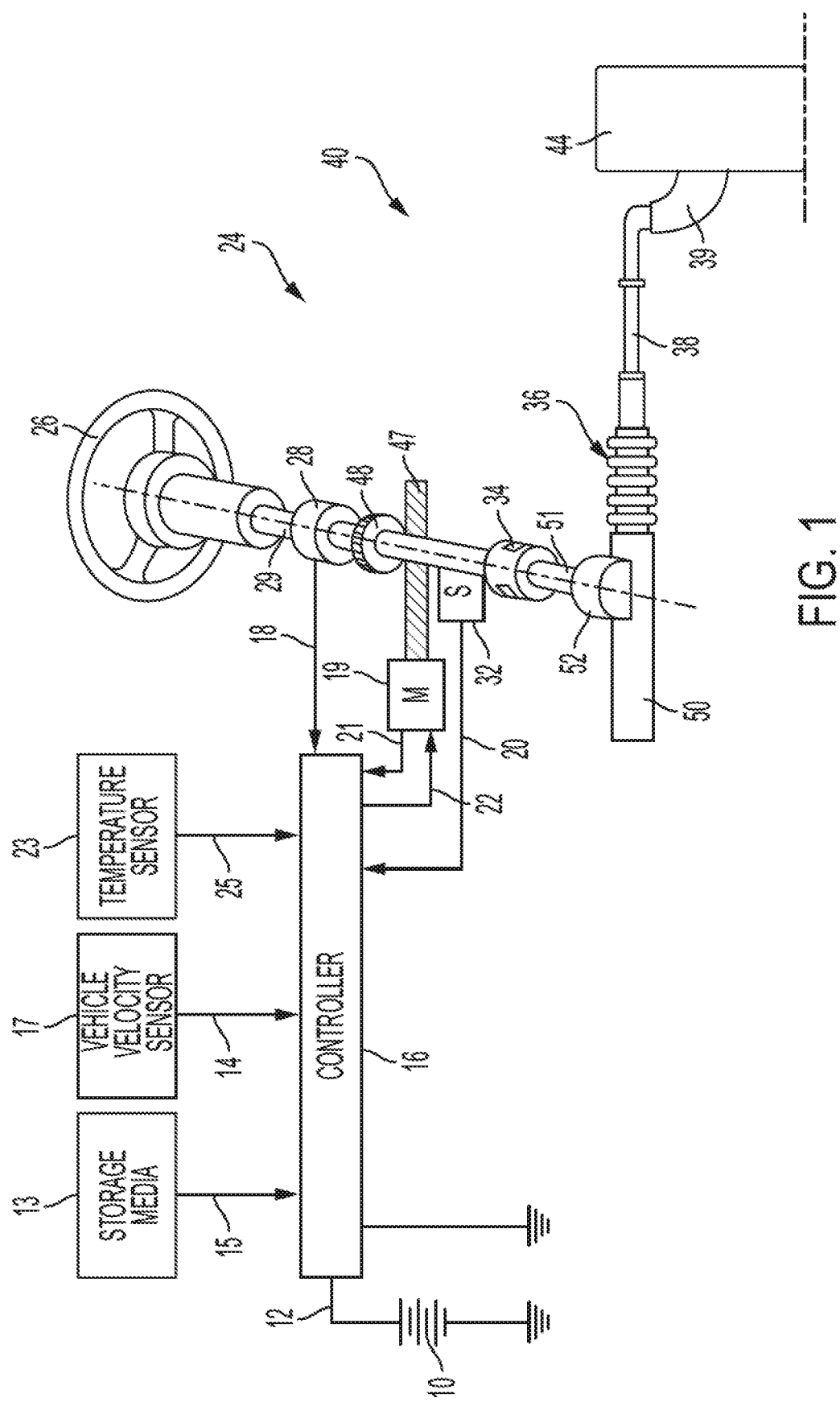
FIG. 1 depicts a block diagram of an exemplary embodiment of an electric power steering system according to aspects of the present disclosure.

Referring now to the figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g., a hand wheel and the like), is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet synchronous motor (PMSM), and is hereinafter denoted as electric machine 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted ωm may be measured, calculated or a combination thereof. For example, the motor velocity ωm may be calculated as the change of the motor position θ as measured by a position sensor 32 over a prescribed time interval. For example, motor speed ωm may be determined as the derivative of the motor position θ from the equation ωm=Δθ/Δt where Δt is the sampling time and Δθ is the change in position during the sampling interval. Alternatively, motor velocity may be derived from motor position as the rate of change of position with respect to time. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 16 operates in a feedback control mode, as a current regulator, to generate the command 22. Alternatively, in one or more examples, the controller 16 operates in a feedforward control mode to generate the command 22. Because these voltages are related to the position and speed of the motor 19 and the desired torque, the position and/or speed of the rotor and the torque applied by an operator are determined. A position encoder is connected to the lower steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the foregoing. The position encoder outputs a position signal 20 indicating the angular position of the lower steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time-based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

Proportional-integral-derivative (PID) control loops are used to generate control output signals u for controlling a wide variety of different processes in a range of different industries, since PID control loops are relatively cost effective and easy to tune. As the name implies, a proportional-integral-derivative (PID) control loop generates the control output signal u as a sum of a proportional control term $u_P$, an integral control term $u_I$, and a derivative control term $u_D$. The control output signal u may also be written as u(t) to indicate that it varies as a function of time. Other, related control loops may be used to generate control output signals, such as a proportional-integral (PI) control loop, which may be similar to a PID control loop, without a derivative control term $u_D$.

Figure 2:
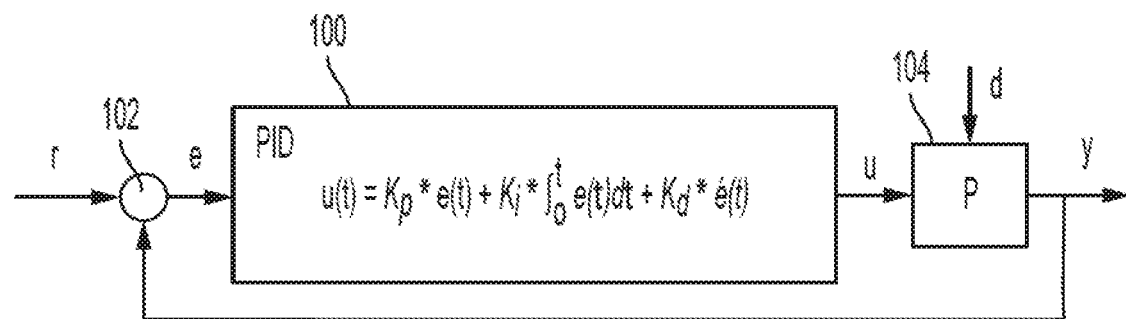
FIG. 2 depicts a block diagram of a control method according to aspects of the present disclosure.

An example PID control loop 100 for controlling an electric power steering (EPS) system is shown in FIG. 2, where r is a target angle, u is the control output signal, y is pinion angle, e is an error signal. The control output signal u may be, for example, a motor torque command. A difference block 102 computes the error signal e as e=r−y. P is the EPS system, which is represented by block 104, and d is an external disturbance, such as a bump in the road, that acts upon the EPS system P. Also, in FIG. 2, we assume zero initial condition on integral control.

Figure 3:
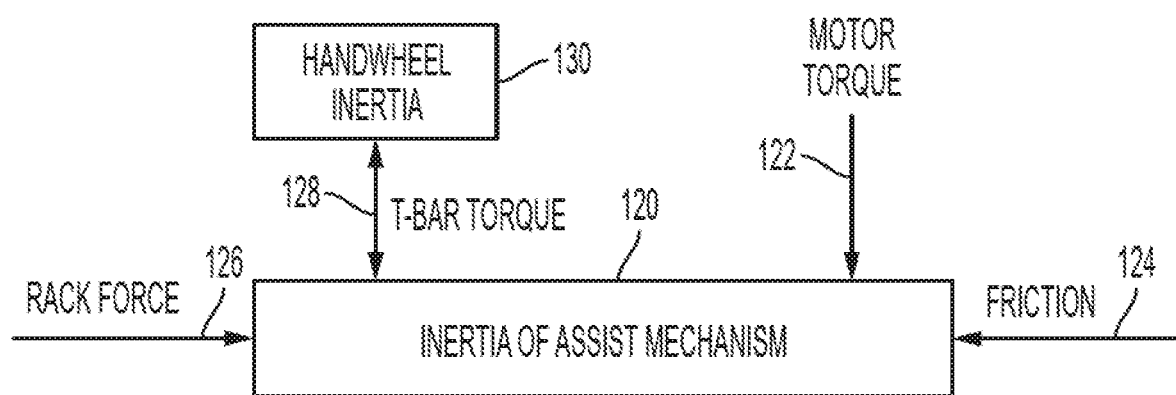
FIG. 3 depicts a block diagram of forces contributing to inertia of a steering assist mechanism according to aspects of the present disclosure.

A model of the electric power steering system P is shown FIG. 3. The EPS system includes an assist mechanism that produces torque for steering a vehicle. The assist mechanism may include the electric motor 19, worm 47 and worm gear 48, as shown in the example of FIG. 1. Other different types of assist mechanisms may be used, which may depend on the particular arrangement of the steering system. As shown in FIG. 3, the assist mechanism has a mechanism inertia 120 that is affected by a number of different forces. Those forces include a motor torque 122 applied by the electric motor 19, friction 124, such as internal friction of the assist mechanism, and rack force 126 from the steering mechanism 36. The forces acting upon the assist mechanism may also include a torsion bar (also called T-bar) torque 128, which includes handwheel inertia 130 and other external forces acting upon the steering wheel 26. Handwheel inertia 130 and T-bar torque 128 may not exist in some systems (e.g. autonomous driving vehicles without a steering wheel or road-wheel system in a steer-by-wire configuration).

A PID control loop 100 employs a PID algorithm to compute the control output u as a function of time, u(t). The PID algorithm can be regarded as a combination of feedforward, feedback, and integral control, as shown in Equation (1):

$$u(t) = K_i * \int_0^t e(\tau)d\tau + C_0 + K_p(r(t) - y(t)) + K_d * (\dot{r}(t) - \dot{y}(t)) =$$
$$(K_p * r(t) + K_d * \dot{r}(t)) - (K_p * y(t) + K_d * \dot{y}(t)) + K_i * \int_0^t e(\tau)d\tau + C_0$$

where $(K_p*r(t)+K_d*\dot{r}(t))$ is a PID feedforward term $u_F(t)$ that is a function of the target angle r; and where $(K_p*y(t)+K_d*\dot{y}(t))$ is a PID feedback term $u_B(t)$ that is a function of the actual steering angle y; and where $(K_i*\int_0^t e(\tau)d\tau+C_0)$ is a PID integral control term $u_I(t)$ that is a function of the error signal e; and $C_0$ is the initial value of the integral control term $u_I(t)$. In some embodiments, the initial value $C_0$ is 0. Here, t=0 represents an initial time when the PID control loop is first activated. For example, t=0 may represent a time when angle control is switched from disable to enable. Also, as shown in Equation (1), the PID algorithm constrains the PID feedforward and PID feedback terms to use common tuning parameters (e.g. $K_p$ and $K_d$), which may limit the ability to tune the PID algorithm to optimize for performance, stability, and robustness.

The PID algorithm can be extended to a general control algorithm with discrete feedforward, feedback, and integral control terms. That is as shown in Equation (2): $u(t)=u_I(t)+u_F(t)-u_B(t)$, where:

$$u_I(t)=K_i*\int_0^t e(\tau)d\tau+C_0$$

$$u_F(t)=K_{f1}*r(t)+K_{f2}*\dot{r}(t)$$

$$u_B(t)=K_{b1}*y(t)+K_{b2}*\dot{y}(t)+K_{b3}*x_3(t)+K_{b4}*x_4(t)$$

In some embodiments, the discrete feedback term $u_B(t)$ may include additional system states beyond those of the PID feedback term. For example, $x_3(t)$ and $x_4(t)$ of Equation (2) are other system states (e.g. a position of the steering wheel 26 and a velocity of the steering wheel 26, respectively). Furthermore, the discrete feedforward, feedback, and integral control terms may have separate tuning parameters $K_{f1}$, $K_{f2}$, $K_{b1}$, $K_{b2}$, $K_{b3}$ and are not constrained by the common tuning parameters in the feedforward and feedback terms, (e.g. $K_p$, $K_i$ and $K_d$ of the PID algorithm). Note that feedforward and/or feedback control (e.g. a control algorithm dominated by PID or discrete feedforward and/or PID or discrete feedback terms) may respond to system state faster than integral control, because of the nature of integral control, which may increase in effect over time, beginning at time t=0, particularly where the initial value $C_0$=0. Furthermore, feedforward control has no influence on closed-loop stability. The steering system may be a multi-order system, where some system dynamics (e.g. column dynamics and motor dynamics) may be ignored in a PID control algorithm, such as the control algorithm shown in Equation (1).

In some cases, the control algorithm may have a non-zero initial condition, which may cause an issue for the general control algorithm of Equation (2). For example, where general control algorithm is used for position control starting from an off-center angle. That is to say, at initial time, r(0)=y(0), and r(0)≠0. Accordingly, $u_I(0)$=0 (assuming $C_0$=0), and $u_F(0)-u_B(0)$≠0. Hence, u(0)≠0, which may result in a jump in motor torque at time t=0, when position control is enabled. This motor torque jump can generate undesired movement in the steering system. It can be more severe if $r(0) \neq y(0)$ (i.e. $e(0) \neq 0$) at time $t=0$.

Figure 4:
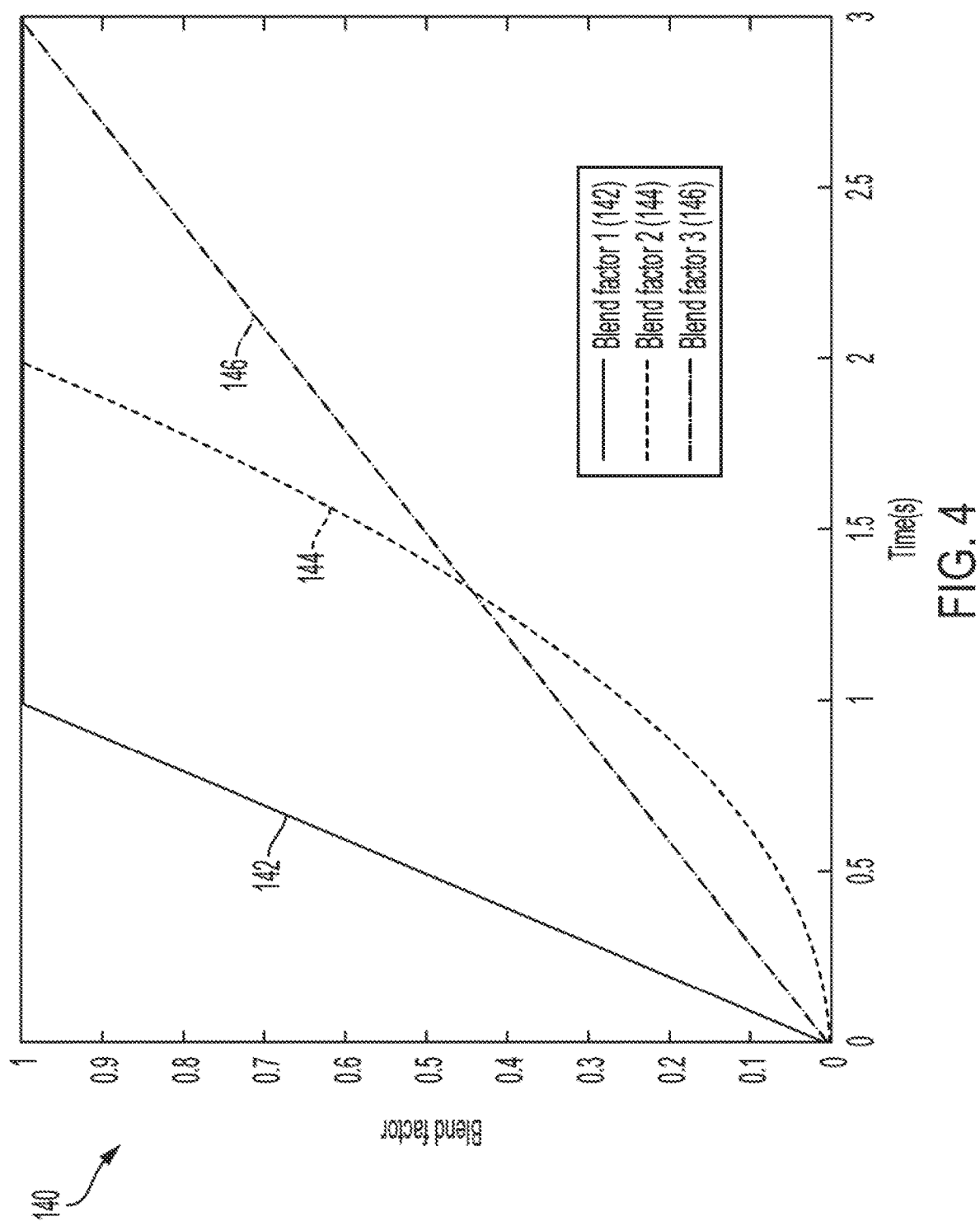
FIG. 4 depicts a graph of different blend factors in a time-based blend factor technique according to aspects of the present disclosure.

A conventional solution to address this issue is to multiply a time-based blend factor 142, 144, 146 (which may be, e.g. from 0 to 1) by control $u(t)$, so that the control u will start from 0 to the normal calculated value as time goes. Some examples of blend factors are shown in FIG. 4. Specifically, FIG. 4 shows a graph 140 with plots of a first blend factor 142 (labeled "Blend factor 1), a second blend factor 144 (labeled "Blend factor 2), and a third blend factor 146 (labeled "Blend factor 3). The first and third blend factors 142, 146 have a constant linear slope, with the first blend factor 142 increasing more rapidly than the third blend factor 146. The second blend factor 144 has an exponential slope. It should be understood that these are merely examples, and that a time-based blend factor 142, 144, 146 may have a different form which may be linear or non-linear.

The use of a time-based blend factor 142, 144, 146 can provide time for an integrator term to catch-up with the feedforward and feedback controls. However, a time-based blend factor 142, 144, 146 can introduce undesirable delay (for example, several seconds) to make control u to the normal level and the movement smooth. Also, tuning of the time-based blend factor 142, 144, 146 is related to the tuning of control algorithm, which can increase tuning efforts.

Figure 5:
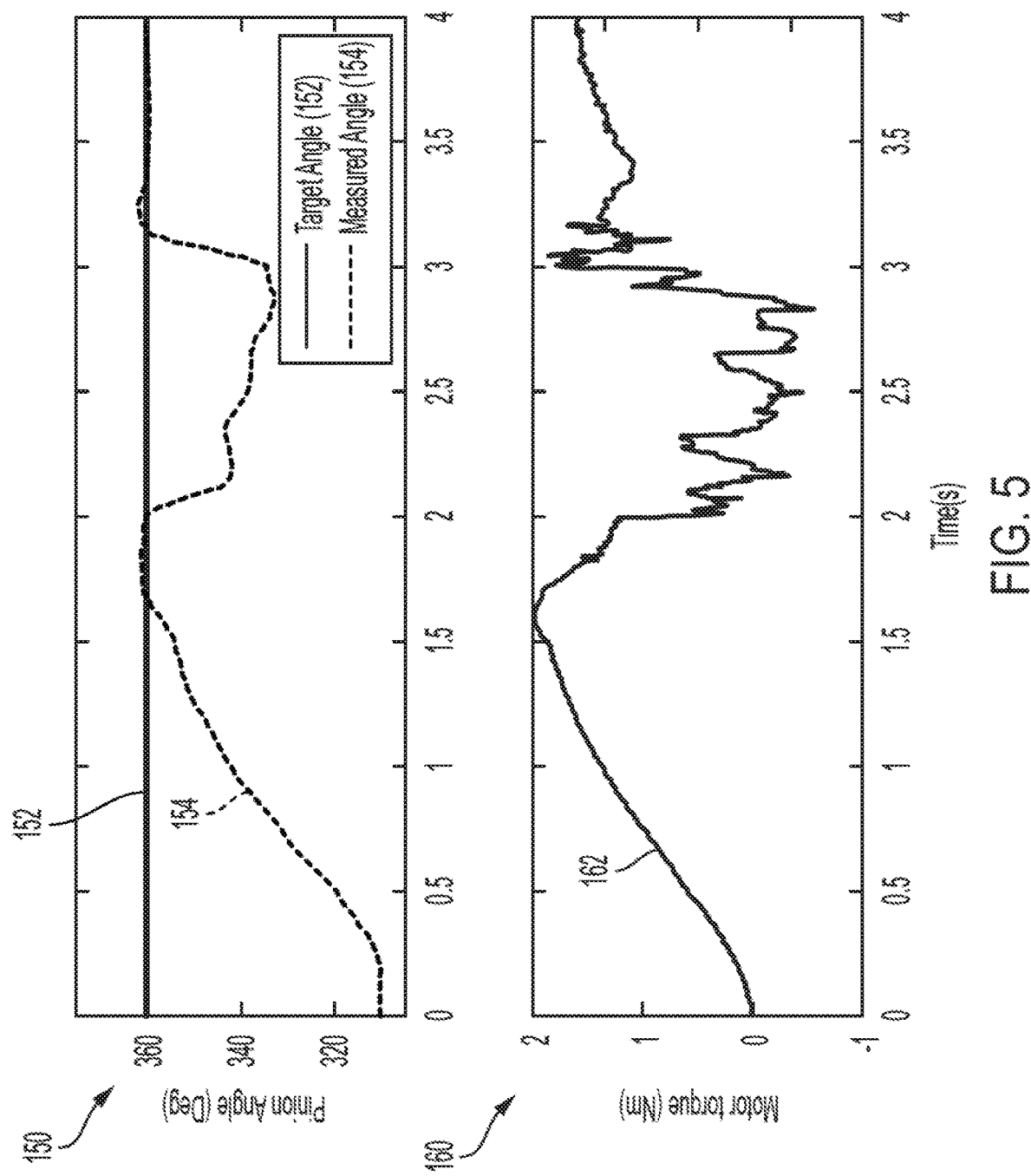
FIG. 5 depicts graphs illustrating performance of position control using the time-based blend factor technique according to aspects of the present disclosure.

FIG. 5 shows the performance of position control in an EPS system using the time-based blend factor technique. FIG. 5 includes a first graph 150 of pinion angle over time, including a target angle plot 152, and a measured angle plot 154. FIG. 5 also shows a second graph 160 including a plot 162 of motor torque over time. The target angle plot 152 shows the target angle r having a constant value of 360 degrees, and the measured angle plot 154 shows the actual pinion angle y (also called the Measured Angle) varying over time. The position control is enabled at time $t=0$, and $r(0) \neq y(0)$ (i.e. $e(0) \neq 0$). It takes more than 3 seconds for the actual pinion angle y to settle at the target angle r. Furthermore, the movement of the actual pinion angle y is not particularly smooth in the example depicted. In order to tune the system to produce smoother motion of the actual pinion angle y using the time-based blend factor technique, the time for the actual pinion angle y to settle at the target angle r may be even longer.

Figure 6:
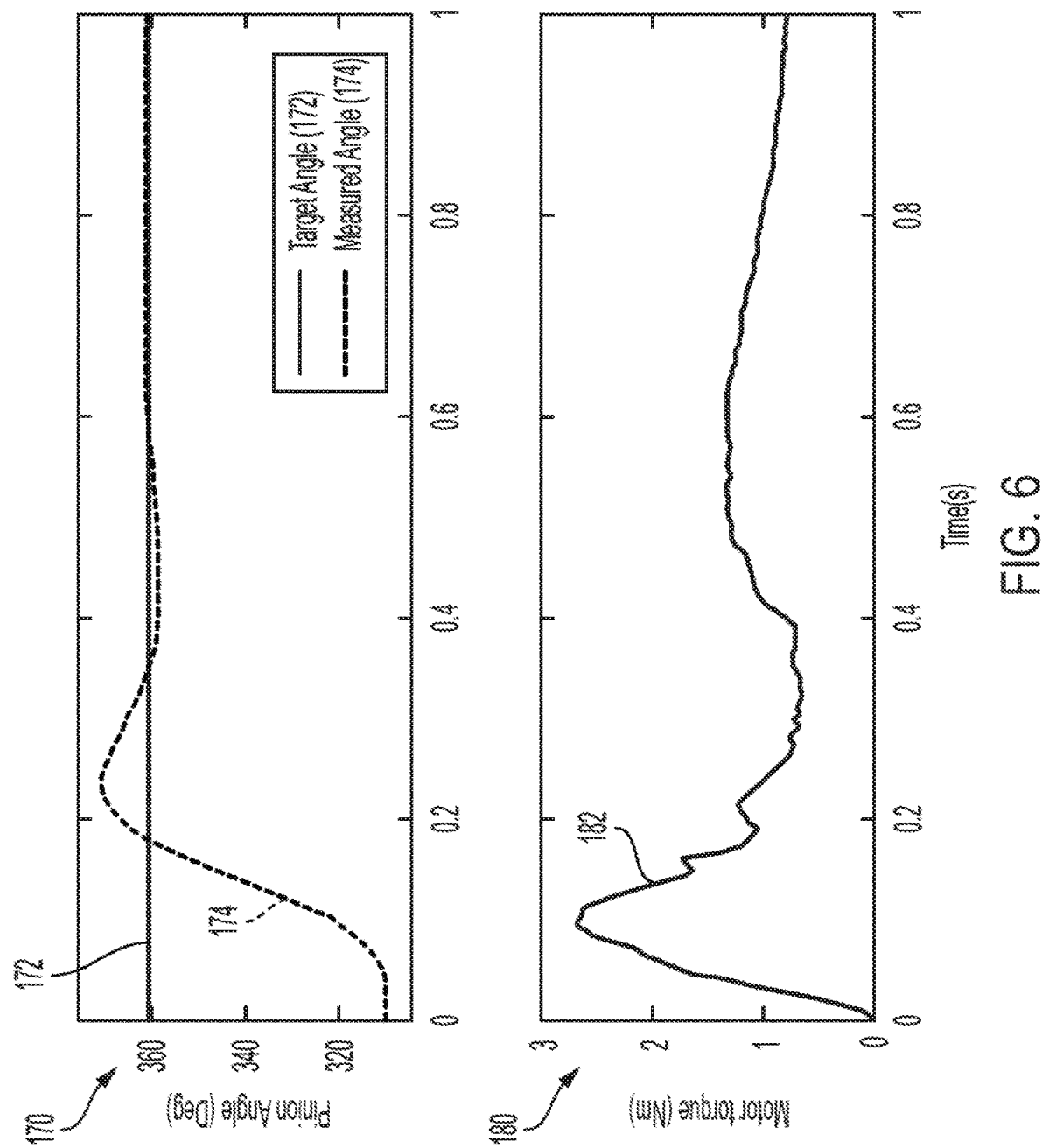
FIG. 6 depicts graphs illustrating performance of position control using a control technique according to aspects of the present disclosure.

FIG. 6 shows the performance of position control in an EPS system according to one or more embodiments of the present disclosure, using a position control technique that includes computing the initial value $C_0$ of the integral control term $u_I$ based on the feedback term $u_B$ and the feedforward term $u_F$. Specifically, FIG. 6 shows a position control technique that includes computing the initial value $C_0=-(u_F(0)-u_B(0))$. In other words, The initial value $C_0$ of the integral control term $u_I$ is computed as a negative of the initial value of the feedforward term $u_F(0)$ minus the initial value of the feedback term $u_B(0)$. FIG. 6 includes a first graph 170 of pinion angle over time, including a target angle plot 172, and a measured angle plot 174. FIG. 6 also shows a second graph 180 including a plot 182 of motor torque over time. The target angle plot 172 shows the target angle r having a constant value of 360 degrees, and the measured angle plot 174 shows the actual pinion angle y (also called the Measured Angle) varying over time. The position control is enabled at time $t=0$, and $r(0) \neq y(0)$ (i.e. $e(0) \neq 0$). It takes about 0.6 seconds for the actual pinion angle y to settle at the target angle r. Furthermore, the movement of the actual pinion angle y using the technique of the present disclosure is much smoother than the time-based blend factor technique shown in FIG. 5. Note that the same control algorithm with same tuning are used in the plots of FIGS. 5 and 6. It is concluded that the technique of the present disclosure has better performance (e.g. smoother movement and faster response). Also, the technique of the present disclosure may require less tuning effort than the time-based blend factor technique.

The technical solutions described herein address such technical challenge of handling the non-zero initial condition issue mentioned above. The technical solutions described herein utilize the initial value of integral control (i.e. $C_0$), which is traditionally set to be 0. The technical solutions described herein provide an improvement over techniques that employ a time-based blend factor. Specifically, the technique of the present disclosure can make the movement smooth, substantially immediately. Also, no more tuning effort is needed using such technical solutions described herein.

According to one or more embodiments, the present disclosure includes a processor configured to calculate feedforward and feedback control at initial time first, i.e. $u_F(0)-u_B(0)$. Then we set $C_0=-(u_F(0)-u_B(0))$. Therefore, $u(0)=C_0+u_F(0)-u_B(0)=0$. In the discrete-time implementation, the integrator state is set to be $-(u_F(k)-u_B(k))$, at discrete time k, if position control is enabled at time k and position control is disabled at time k−1. This facilitates to push integrator state to catch up with feedforward and feedback controls by utilizing the initial value of integral control.

Figure 7:
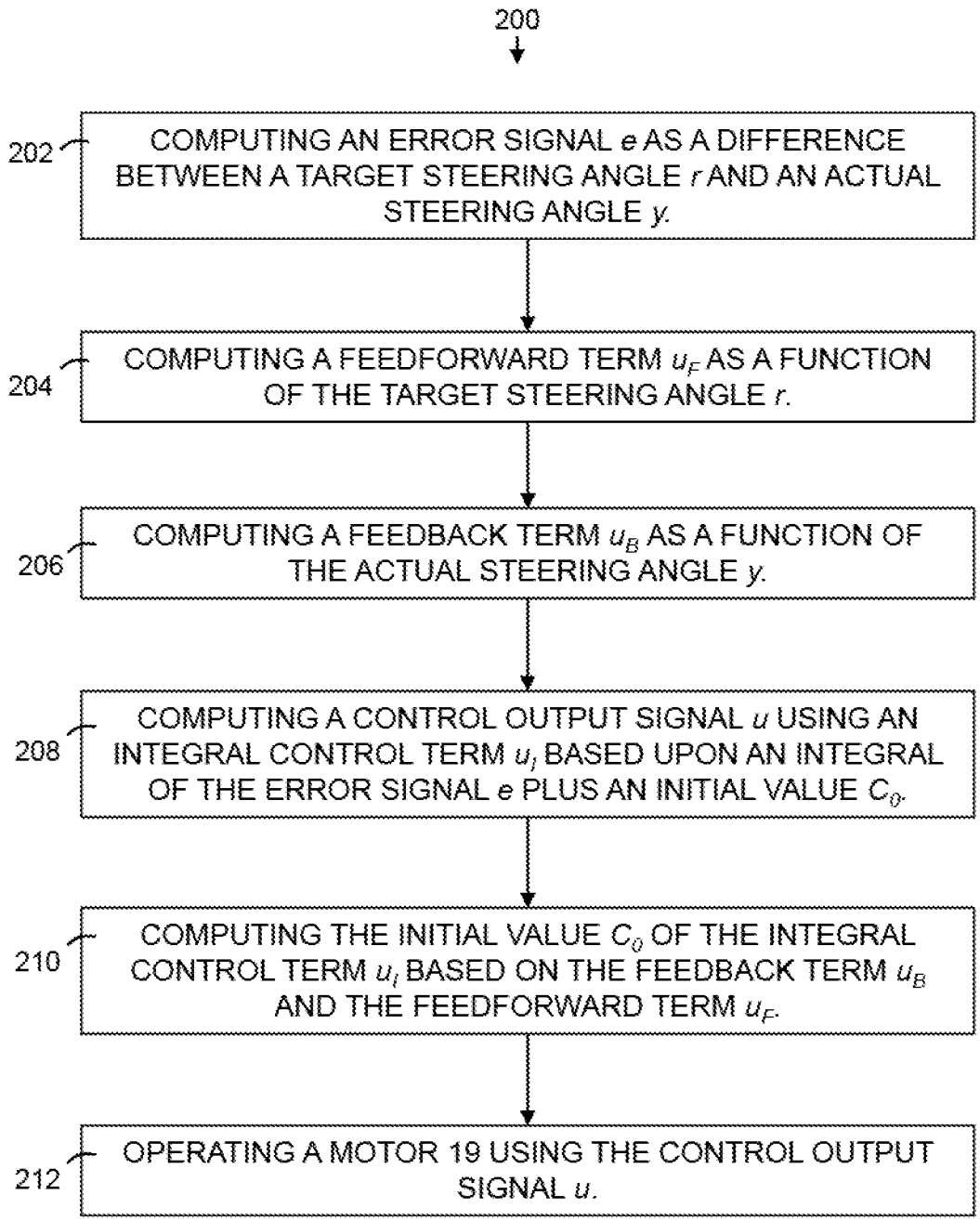
FIG. 7 depicts a flow chart listing steps in a method for controlling a steering angle in a steering system.

As described in the flow chart of FIG. 7, a method 200 controlling a steering angle in a steering system, such as electric power steering system (EPS) 40 is also provided. The method 200 includes computing an error signal e as a difference between a target steering angle r and an actual steering angle y at step 202. In some embodiments, the target steering angle r is received from an advanced driver assist system (ADAS). In some embodiments, the steering system is a steer-by-wire steering system, and the target steering angle r is computed based on a position of the steering wheel 26

The method 200 also includes computing a feedforward term $u_F$ as a function of the target steering angle r at step 204. The feedforward term $u_F$ may be a PID feedforward term, such as $(K_p*r(t)+K_d*\dot{r}(t))$. Alternatively, the feedforward term $u_F$ may be a proportional-integral (PI) feedforward term, such as $(K_p*r(t))$. Alternatively, the feedforward term $u_F$ may be a discrete feedforward term, such as $u_F(t)=K_{f1}*r(t)+K_{f2}*\dot{r}(t)$.

The method 200 also includes computing a feedback term $u_B$ as a function of the actual steering angle y at step 206. The feedback term $u_B$ may be a PID feedback term, such as $(K_p*y(t)+K_d*\dot{y}(t))$. Alternatively, the feedback term $u_B$ may be a proportional-integral (PI) feedback term, such as $(K_p*y(t))$. Alternatively, the feedback term $u_B$ may be a discrete feedback term, such as $u_B(t)=K_{b1}*y(t)+K_{b2}*\dot{y}(t)$.

The method 200 also includes computing a control output signal u using an integral control term $u_I$ based upon an integral of the error signal e plus an initial value $C_0$ at step 208. The integral control term $u_I$ may be written as a function of time, such as $u_I(t)$. In some embodiments, the integral control term $u_I$ may be computed by integrating the error signal e over time. For example, the integral control term may be calculated as $u_I(t)=K_i*\int_0^t e(\tau)d\tau+C_0$, where $K_i$ is a predetermined value, e is the error signal, and $C_0$ is the initial value of the integral control term $u_I(t)$ at time $t=0$.

The method 200 also includes computing the initial value $C_0$ of the integral control term $u_I$ based on the feedback term $u_B$ and the feedforward term $u_F$ at step 210. In some embodiments, initial value $C_0$ of the integral control term $u_I$ is computed as $C_0 = -(u_F(0) - u_B(0))$, where $u_F(0)$ is an initial value of the feedforward term $u_F$, and $u_B(0)$ is an initial value of the feedback term $u_B$. In some embodiments, the step of computing the initial value $C_0$ of the integral control term $u_I$ based on the feedback term $u_B$ and the feedforward term $u_F$, may be performed in response to switching operation of the steering system out of a manual control mode. For example, the initial value $C_0$ of the integral control term may be computed upon switching the steering system out of a manual control mode into a cooperative or shared control mode, which may include inputs from an ADAS system in addition to user inputs. In another example, the initial value $C_0$ of the integral control term may be computed upon switching the steering system from a manual control mode and into an automated control mode, which may be, for example, part of an autonomous driving mode.

The method 200 concludes with operating a motor 19 using the control output signal u at step 212. In some embodiments, the control output signal u is a torque command, and step 212 may include generating a torque corresponding to the control output signal u. The torque corresponding to the control output signal u may be generated, for example, by the motor 19. In some embodiments, the control output signal u corresponds to a change in torque generated by one or more components in the steering system. Step 212 may include increasing or decreasing the torque generated by the motor 19 based upon the control output signal u. For example, a control output signal u having a given value, such as u=0, may cause the motor 19 to maintain a given torque output. In some embodiments, the control output signal u is a position command, and the motor 19 causes one or more components within the steering mechanism 36 to move to a commanded position corresponding to the control output signal u. In some embodiments, the control output signal u is a change in position command. For example, a control output signal u having a given value, such as u=0, may cause the motor 19 to maintain the steering mechanism 36 at a given position.

The technical solutions described herein do not increase tuning efforts on control algorithm. Also, the technical solutions described herein do not impact anti-windup method of integrator. Further, the technical solutions described herein can be used in either integrator or pseudo/leaky integrator. Further yet, the technical solutions described herein can be used in either single electronic control unit (ECU) or dual ECUs.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. A steering system comprising:
   a motor configured to adjust a steering angle; and
   a processor coupled with the motor, the processor configured to perform a method for controlling the motor according to a target steering angle, the method comprising:
   computing an error signal as a difference between the target steering angle and an actual steering angle;
   computing a feedforward term as a function of the target steering angle;
   computing a feedback term as a function of the actual steering angle;
   computing a control output signal using an integral control term based upon an integral of the error signal plus an initial value;
   computing the initial value of the integral control term based on the feedback term and the feedforward term; and
   operating the motor using the control output signal.

2. The steering system of claim 1, wherein the control output signal is a torque command; and wherein operating the motor using the control output signal includes generating a torque corresponding to the control output signal by the motor.

3. The steering system of claim 1, wherein the initial value of the integral control term is computed as $C_0=-(u_F(0)-u_B(0))$, where $u_F(0)$ is an initial value of the feedforward term and $u_B(0)$ is an initial value of the feedback term.

4. The steering system of claim 1, wherein computing the control output signal using the integral control term is performed by a proportional-integral-derivative (PID) control loop.

5. The steering system of claim 1, wherein the internal control term ($u_I$) is computed as $u_I(t)=K_i*\int_0^t e(\tau)d\tau+C_0$, where $K_i$ is a predetermined value, e is the error signal, and $C_0$ is the initial value.

6. The steering system of claim 1, wherein the target steering angle is received from an advanced driver assist system (ADAS).

7. The steering system of claim 1, wherein computing the initial value of the integral control term based on the feedback term and the feedforward term is performed in response to switching operation of the steering system out of a manual control mode.

8. The steering system of claim 1, wherein the steering system is a steer by wire steering system, and the target steering angle is computed based on a position of a steering wheel.

9. A method for controlling a steering angle according to a target steering angle in a steering system, the method comprising:
   computing an error signal as a difference between the target steering angle and an actual steering angle;
   computing a feedforward term as a function of the target steering angle;
   computing a feedback term as a function of the actual steering angle;
   computing a control output signal using an integral control term based upon an integral of the error signal plus an initial value;
   computing the initial value of the integral control term based on the feedback term and the feedforward term; and
   operating a motor using the control output signal.

10. The method of claim 9, wherein the control output signal is a torque command; and wherein operating the motor using the control output signal includes generating a torque corresponding to the control output signal by the motor.

11. The method of claim 9, wherein the initial value of the integral control term is computed as $C_0=-(u_F(0)-u_B(0))$, where $u_F(0)$ is an initial value of the feedforward term and $u_B(0)$ is an initial value of the feedback term.

12. The method of claim 9, wherein computing the control output signal using the integral control term is performed by a proportional-integral-derivative (PID) control loop.

13. The method of claim 9, wherein the integral control term is computed as $u_I(t)=K_i*\int_0^t e(\tau)d\tau+C_0$, where $K_i$ is a predetermined value, e is the error signal, and $C_0$ is the initial value.

14. The method of claim 9, wherein the target steering angle is received from an advanced driver assist system (ADAS).

15. The method of claim 9, wherein the steering system is a steer by wire steering system, and the target steering angle is computed based on a position of a steering wheel.

16. A control system comprising:
   a processor configured to perform a method for controlling a steering angle according to a target steering angle in a steering system, the method comprising:
      computing an error signal as a difference between the target steering angle and an actual steering angle;
      computing a feedforward term as a function of the target steering angle;
      computing a feedback term as a function of the actual steering angle;
      computing a control output signal using an integral control term based upon an integral of the error signal plus an initial value;
      computing the initial value of the integral control term based on the feedback term and the feedforward term; and
      operating the motor using the control output signal.

17. The control system of claim 16, wherein the control output signal is a torque command; and wherein operating the motor using the control output signal includes generating a torque corresponding to the control output signal by the motor.

18. The control system of claim 16, wherein the initial value of the integral control term is computed as $C_0=-(u_F(0)-u_B(0))$, where $u_F(0)$ is an initial value of the feedforward term and $u_B(0)$ is an initial value of the feedback term.

19. The control system of claim 16, wherein computing the control output signal using the integral control term is performed by a proportional-integral-derivative (PID) control loop.

20. The control system of claim 16, wherein computing the initial value of the integral control term based on the feedback term and the feedforward term is performed in response to switching operation of the control system out of a manual control mode.

* * * * *